UNITED STATES PATENT OFFICE.

FREDERICK M. EKERT, OF ASHLAND, OHIO.

COMPOSITION OF MATTER FOR PACKING, LINING, AND INSULATING PURPOSES.

No. 802,377.      Specification of Letters Patent.      Patented Oct. 24, 1905.

Application filed August 2, 1905. Serial No. 272,325.

*To all whom it may concern:*

Be it known that I, FREDERICK M. EKERT, residing at Ashland, in the county of Ashland and State of Ohio, have invented a certain new and useful Improvement in Compositions of Matter for Packing, Lining, and Insulating Purposes, of which the following is a full, clear, and exact description.

My invention consists of a composition of matter which will effectively resist the passage of fluids under high pressure and will successively withstand for a long period of time the action of such fluids even though the temperature thereof may be high, that will be impervious to the attacks of acids and alkalies, and that will prevent the passage of electric currents therethrough. A composition possessing such high-resistance qualities is admirably adapted for valve construction in conduits conveying saturated or superheated steam under the high pressures and temperatures that are employed in modern industries, for the interior of or as linings for conduits or receptacles for acids and alkalies, as well as for insulation for electric currents.

The composition for the purposes above set forth consists, basically, of a vulcanizable compound of rubber or similar material of gum-like consistency, sulfur, lead, and asbestos, fibrous or powdered. The sulfur is employed, preferably, in the form of flowers of sulfur as the vulcanizing agent. The only form of lead possessing the necessary qualities for my purposes is the monoxid, (litharge,) whether it be pure monoxid or be present as an impurity of or mixed with metallic lead, lead alloys, or other combinations of the lead, as the sulfid. This monoxid reacts and unites with the rubber, sulfur, and silica of the silicates chemically during vulcanization, imparting enormous strength and resistance to the composition.

With the above ingredients as a basis I employ others, according to the purpose for which the composition is to be employed.

A particularly large and important field for my composition is found in the construction of valves for steam-conduits. The high pressures and accompanying high temperatures under which steam is employed for modern industrial purposes have rendered comparatively useless elastic valve compositions which have hitherto given satisfaction, such compositions burning away or otherwise deteriorating and permitting the leakage of steam after having been in use but a short time. This has resulted in the renouncing by the trade of elastic compositions for valve construction, particularly valve-disks, and the substitution therefor of metal, such as copper and bronze, which, however, are unable to prevent the leakage of fluids under high pressures or temperatures, or both.

For valve construction and for packing for steam connections, either hard, semihard, or soft, I employ the following ingredients in about the proportions stated, producing thereby a body that not only possesses the requisite elasticity, together with the solidity, density, strength, and high-resisting powers necessary to prevent leakage, but retains these qualities when subjected to long and continued use. The ingredients and the proportions, by weight, are as follows: rubber, one part; fibrous asbestos, two to three parts; sulfur, (flowers,) one-twentieth to one part; lead monoxid, one to three parts; resin, one-fourth to one part; zinc or zinc combinations, one part; iron oxid, one part; graphite, one part; magnesium silicates, as powdered asbestos, glimmer, or mica, one part.

In the composition produced by the admixture and combination of the above ingredients the rubber or similar gum-like material provides the necessary binding power and insures the elasticity thereof. The sulfur is the vulcanizing agent and according to the quantity employed imparts varying degrees of hardness thereto. The fibrous asbestos provides a solid body and furnishes resistance to the pressure and heat of the steam; but being porous to a greater extent than the rubber itself the iron oxid, zinc, (either metallic or in combination,) powdered magnesium silicates, and graphite are employed as the best pore-fillers to cure this defect. The resins or equivalent resin-like materials (as pitch, asphalt, &c.) assist in the mechanical mixing of the ingredients, allowing larger compounding and making the compound itself plastic, proportional to the amount employed, and insuring a more intimate combination of the molecules of the materials. The lead in the form of the monoxid produces enormous resisting qualities in the compound and also gives to the body thereof uniform strength and unequaled solidity by reason of its intense chemical action and permanent chemical combination upon and with the molecules of the rubber, sulfur, and the silica of the silicates during the process of vulcanization. As an additional protection the composition when vulcanized may be given a coating of graphite or metal except where the composition is to be employed for insulating purposes.

For receptacles or conduits for acids and alkalies or for linings and packings therefor I employ as the base thereof the same proportions of rubber, (or similiar gum-like material,) sulfur, lead monoxid, fibrous asbestos, and resin as in the case of valve and steam packings, &c., and, with these, four parts altogether of the best-qualified pore-fillers for this purpose—powdered magnesium silicate and graphite.

For insulation for electric currents I omit from the composition any material that will form therewith a conductor for the current, employing as the base thereof the same proportions of rubber, sulfur, fibrous asbestos, and lead monoxid as in the case of valve and steam packings, &c., and with these, as the best pore-fillers, about four parts of magnesium silicates.

The variations in the proportions of the ingredients as set forth herein are necessary to adapt the composition to the various uses to which it may be applied. For instance, the variation of the amount of sulfur is for the purpose of rendering the composition softer or harder by vulcanization. The resin or resins employed are also adapted for the uses to which the composition is to be applied, those having a higher melting-point being used where the composition must possess higher resistance. While in the table which appears hereinbefore I have set forth one part each of the pore-fillers, the proportions of each may be varied by substituting more or less of one for another, according to the mixing qualities, degrees of stiffness, elasticity, body, density, or hardness of the composition desired or to the numerous purposes for which the finished products are to be employed. For instance, more zinc and less iron oxid or graphite may be employed, as the zinc mixes better with the rubber. Increasing the proportions of the magnesium silicate increases the stiffness of the compound. Graphite or metallic zinc, being conductors, will be entirely eliminated in the insulating material. Also zinc and iron, being more easily attacked by acids and alkalies, must be omitted from the composition for packings, linings, &c., for such agents. Furthermore, while the particular highest resisting pore-fillers herein set forth are by far the best with which I am acquainted for the purpose and possess the best mixing qualities with the other materials, especially with the rubber and sulfur, I do not propose to be limited to such particular pore-filling materials as above, since they may be replaced by others possessing more or less of the same qualities.

In the table which appears hereinbefore and in the explanation regarding the use of the pore-fillers I have set forth a liberal range of the proportions of each ingredient and have found by prolonged tests and practically unlimited experiments that these proportions give the best practical results in manufacture whether for steam under all pressures, for insulating purposes, or for the linings and packings for conduits or receptacles containing acids and alkalies. At the same time, however, it is possible to still further vary the proportions of the ingredients and produce a composition of similar general qualities, but with pronounced particular characteristics. For instance, as hereinbefore pointed out, the office of the rubber is to impart elasticity and binding power to the composition. By using less rubber than set forth, especially when used in solution, the elasticity and binding powers are decreased, particularly the former. By further increasing the proportions of the resin, particularly when resin is in solution, permitting it to penetrate the entire mass, the binding power will also be increased. Also the fibrous asbestos may be replaced to a considerable extent by the high resisting pore-fillers, thereby sacrificing the solidity and strength of the body to the density or impenetrability thereof, or the asbestos may be increased and the pore-fillers decreased, thereby sacrificing more or less of the density or impenetrability of the body to the solidity and strength thereof. A larger proportion of the lead monoxid will have the effect of binding the ingredients together by reason of its intense chemical action and will greatly shorten the time required for vulcanization, while smaller quantities of the lead monoxid than are given in the proportions stated—for example, as when it is present as an impurity of or mixed with metallic lead, lead alloys, lead sulfid, &c.—will have a correspondingly smaller binding effect and will greatly prolong the period of vulcanization. The proportions of ingredients given in the table are therefore considered by me as the best for all general purposes. Furthermore, it is advisable that the compounds should be thoroughly dry before vulcanization.

While for convenience of description I have generally employed the terms "resin," "rubber," "zinc," and "lead" in the specification and the claims hereto annexed, I do not intend to exclude thereby the equivalents thereof, especially such equivalents as have been described herein.

Having thus described my invention, what I claim as new, and desire to secure by Letters Patent, is—

1. A composition of matter containing rubber, sulfur, fibrous asbestos, and lead monoxid, united by vulcanization, substantially as specified.

2. A composition of matter containing rubber, sulfur, fibrous asbestos, lead monoxid, and high-resisting pore-filling materials, united by vulcanization, substantially as specified.

3. A composition of matter containing rubber, sulfur, lead monoxid, and high-resisting pore-filling materials, united by vulcanization, substantially as specified.

4. A composition of matter containing rubber, sulfur, fibrous asbestos, lead monoxid, and resin, united by vulcanization, substantially as specified.

5. A composition of matter containing rubber, sulfur, fibrous asbestos, lead monoxid, high-resisting pore-filling materials, and resin, united by vulcanization, substantially as specified.

6. A composition of matter containing rubber, sulfur, lead monoxid, high-resisting pore-filling material, and resin, united by vulcanization, substantially as specified.

7. A composition of matter containing rubber, sulfur, fibrous asbestos, lead monoxid, and high-resisting pore-filling materials as zinc, iron oxid, graphite, and magnesium silicate, united by vulcanization, substantially as specified.

8. A composition of matter containing rubber, sulfur, fibrous asbestos, lead monoxid, resin, and high-resisting pore-filling materials, as zinc, iron oxid, graphite and magnesium silicate, united by vulcanization, substantially as specified.

9. A composition of matter containing rubber, sulfur, fibrous asbestos, lead monoxid and magnesium silicate, united by vulcanization, substantially as specified.

10. A composition of matter containing rubber, sulfur, fibrous asbestos, lead monoxid, resin and magnesium silicate, united by vulcanization, substantially as specified.

11. A composition of matter containing rubber, sulfur, fibrous asbestos, lead monoxid, magnesium silicate, and graphite, united by vulcanization, substantially as specified.

12. A composition of matter containing rubber, sulfur, fibrous asbestos, lead monoxid, resin, magnesium silicate, and graphite, united by vulcanization, substantially as specified.

13. A composition of matter containing rubber, sulfur, lead monoxid, and high-resisting pore-filling materials as zinc, iron oxid, magnesium silicate and graphite, united by vulcanization, substantially as specified.

14. A composition of matter containing rubber, sulfur, lead monoxid, resin, and high-resisting pore-filling materials as zinc, iron oxid, magnesium silicate and graphite, united by vulcanization, substantially as specified.

In testimony whereof I affix my signature in the presence of two witnesses.

FREDERICK M. EKERT.

Witnesses:
J. B. HULL,
B. W. BROCKETT.

---

It is hereby certified that in Letters Patent No. 802,377, granted October 24, 1905, upon the application of Frederick M. Ekert, of Ashland, Ohio, for an improvement in "Composition of Matter for Packing, Lining, and Insulating Purposes," an error appears in the printed specification requiring correction, as follows: On page 2, lines 110, 111, and 112, the sentence "Furthermore, it is advisable that the compounds should be thoroughly dry before vulcanization," should be stricken out and the following inserted instead, *Furthermore, the ingredients should be intermingled in a dry condition and the mass should be maintained in such dry condition until after vulcanization;* and that the said Letters Patent should be read with this correction therein that the same may conform to the record of the case in the Patent Office.

Signed and sealed this 21st day of November, A. D., 1905.

[SEAL.]

F. I. ALLEN,
*Commissioner of Patents.*

3. A composition of matter containing rubber, sulfur, lead monoxid, and high-resisting pore-filling materials, united by vulcanization, substantially as specified.

4. A composition of matter containing rubber, sulfur, fibrous asbestos, lead monoxid, and resin, united by vulcanization, substantially as specified.

5. A composition of matter containing rubber, sulfur, fibrous asbestos, lead monoxid, high-resisting pore-filling materials, and resin, united by vulcanization, substantially as specified.

6. A composition of matter containing rubber, sulfur, lead monoxid, high-resisting pore-filling material, and resin, united by vulcanization, substantially as specified.

7. A composition of matter containing rubber, sulfur, fibrous asbestos, lead monoxid, and high-resisting pore-filling materials as zinc, iron oxid, graphite, and magnesium silicate, united by vulcanization, substantially as specified.

8. A composition of matter containing rubber, sulfur, fibrous asbestos, lead monoxid, resin, and high-resisting pore-filling materials, as zinc, iron oxid, graphite and magnesium silicate, united by vulcanization, substantially as specified.

9. A composition of matter containing rubber, sulfur, fibrous asbestos, lead monoxid and magnesium silicate, united by vulcanization, substantially as specified.

10. A composition of matter containing rubber, sulfur, fibrous asbestos, lead monoxid, resin and magnesium silicate, united by vulcanization, substantially as specified.

11. A composition of matter containing rubber, sulfur, fibrous asbestos, lead monoxid, magnesium silicate, and graphite, united by vulcanization, substantially as specified.

12. A composition of matter containing rubber, sulfur, fibrous asbestos, lead monoxid, resin, magnesium silicate, and graphite, united by vulcanization, substantially as specified.

13. A composition of matter containing rubber, sulfur, lead monoxid, and high-resisting pore-filling materials as zinc, iron oxid, magnesium silicate and graphite, united by vulcanization, substantially as specified.

14. A composition of matter containing rubber, sulfur, lead monoxid, resin, and high-resisting pore-filling materials as zinc, iron oxid, magnesium silicate and graphite, united by vulcanization, substantially as specified.

In testimony whereof I affix my signature in the presence of two witnesses.

FREDERICK M. EKERT.

Witnesses:
J. B. HULL,
B. W. BROCKETT.

---

It is hereby certified that in Letters Patent No. 802,377, granted October 24, 1905, upon the application of Frederick M. Ekert, of Ashland, Ohio, for an improvement in "Composition of Matter for Packing, Lining, and Insulating Purposes," an error appears in the printed specification requiring correction, as follows: On page 2, lines 110, 111, and 112, the sentence "Furthermore, it is advisable that the compounds should be thoroughly dry before vulcanization," should be stricken out and the following inserted instead, *Furthermore, the ingredients should be intermingled in a dry condition and the mass should be maintained in such dry condition until after vulcanization;* and that the said Letters Patent should be read with this correction therein that the same may conform to the record of the case in the Patent Office.

Signed and sealed this 21st day of November, A. D., 1905.

[SEAL.]

F. I. ALLEN,
*Commissioner of Patents.*

Correction in Letters Patent No. 802,377.

It is hereby certified that in Letters Patent No. 802,377, granted October 24, 1905, upon the application of Frederick M. Ekert, of Ashland, Ohio, for an improvement in "Composition of Matter for Packing, Lining, and Insulating Purposes," an error appears in the printed specification requiring correction, as follows: On page 2, lines 110, 111, and 112, the sentence "Furthermore, it is advisable that the compounds should be thoroughly dry before vulcanization," should be stricken out and the following inserted instead, *Furthermore, the ingredients should be intermingled in a dry condition and the mass should be maintained in such dry condition until after vulcanization;* and that the said Letters Patent should be read with this correction therein that the same may conform to the record of the case in the Patent Office.

Signed and sealed this 21st day of November, A. D., 1905.

[SEAL.]

F. I. ALLEN,
*Commissioner of Patents.*